United States Patent [19]

Tanaka et al.

[11] Patent Number: 4,685,736
[45] Date of Patent: Aug. 11, 1987

[54] INFINITELY POSITIONABLE LOCK FOR RECLINING SEAT

[75] Inventors: Aki Tanaka, Northridge; David E. Landis, Oxnard, both of Calif.

[73] Assignee: P. L. Porter Company, Woodland Hills, Calif.

[21] Appl. No.: 857,337

[22] Filed: Apr. 30, 1986

[51] Int. Cl.[4] ................................................ A47C 1/00
[52] U.S. Cl. ...................................... 297/366; 74/144; 297/367
[58] Field of Search ............... 297/366, 367, 368, 369; 74/144; 16/236

[56] References Cited

U.S. PATENT DOCUMENTS

| | | | |
|---|---|---|---|
| 2,612,343 | 9/1952 | Fraizer et al. | 74/144 X |
| 3,667,804 | 6/1972 | Yasui et al. | 297/366 X |
| 4,294,488 | 10/1981 | Pickles | 297/367 |
| 4,337,978 | 6/1982 | Kazaoka | 297/367 |

Primary Examiner—James T. McCall

[57] ABSTRACT

An infinitely positionable backrest lock for a recliner seat has an upper plate hinged to a lower frame, and a gear train mounted to the lower frame and drivingly engaging the upper plate. The gear train includes a drum surface on which is wound a brake spring normally gripping the drum against rotation for locking the upper plate against pivotal movement. Positive locking of the drum and gear train is assured by an auxiliary spring and associated lever mechanism acting on the brake spring for increasing the frictional engagement between the brake spring and drum surface by more tightly winding the brake spring about the drum. Fail safe operation is assured by a bolt element spring loaded towards interlocking engagement with a toothed periphery of the drum wheel in the event of slippage between the drum surface and brake spring.

7 Claims, 5 Drawing Figures

INFINITELY POSITIONABLE LOCK FOR RECLINING SEAT

BACKGROUND OF THE INVENTION

1. Field of the Invention

The present invention generally pertains to the field of reclining seats and is more particularly directed to a mechanism for locking the movable backrest of a reclining seat at a selected angular position within the seat's range of adjustment.

2. State of the Prior Art

Numerous mechanisms have devised in the past for use in reclining seats. In particular, many such devices have been developed and found widespread usage in automotive seats. To an increasing extent, at least the driver's seat and frequently also the front passenger seat in motor vehicles are furnished as adjustable reclining seats as standard equipment. While the high end automobile models offered by every manufacturer are equipped with electrically operated seats capable of being adjusted in height, tilt, and dashboard spacing, as well as seatback inclination, manually operated mechanical reclining seatback locking devices are used in lower cost vehicles in response to rising consumer expectations for reclining seats as standard equipment in all vehicles. Typically, the backrest is spring loaded towards a fully upright position and the recliner locking mechanism locks the backrest against its forward spring loading. The backrest is repositioned by releasing the locking mechanism and then either pushing backwards against the backrest to overcome the backrest loading spring if it is desired to recline the backrest, or by allowing the backrest spring to move the backrest towards a more upright position. When the desired backrest position has been obtained the locking mechanism is engaged for holding the backrest in the selected position Existing seatback locking mechanism designed for this purpose suffer from undue complexity and consequent high cost, or excessive weight and size. Still other designs achieve relative simplicity at the expense of performance, such as by providing adjustment of the reclinable backrest in fixed increments rather than continuous adjustment to a desired position.

A continuing need exists for a low cost, simple, reliable, manually operated mechanical lock for reclining seats capable of continuous adjustment of the backrest position while maintaining high standards of performance. In particular the locking mechanism must positively restrain the backrest against "creep" and displacement due to vibration, road shock, seat occupant's weight, as well as vehicle acceleration or braking. Such a mechanism must be reliable in daily use over a period of years without maintenance under difficult environmental conditions.

Various continuously positionable locking devices for reclining seats are known, typically including a lower frame assembly which is normally attached to the stationary portion of the seat, and an upper plate element which is pivoted to the frame assembly and affixed to the reclinable backrest, such that the backrest is hinged to the stationary seat portion by means of the plate pivoted to the frame. The pivotable plate has a toothed arcuate lower edge defining a gear rack which is in mesh with a gear wheel rotatably mounted to the frame assembly, such that pivotal movement of the upper plate causes rotation of the gear wheel relative to the frame. It is further known to provide a brake drum wheel, either integral with the aforementioned gear wheel or drivingly connected thereto by means of additional gearing, and a brake spring wound tightly around the brake drum and fixed to the frame so as to normally lock the drum wheel relative to the frame assembly thereby preventing movement of the gear train and consequent pivotal movement of the upper plate, thus locking the backrest. The mechanism is released to permit adjustment of the backrest position by partially unwinding the brake spring to allow rotation of the drum wheel and thereby freeing the gear train and pivotal plate for movement relative to the frame assembly.

While the use of a coil spring as the locking device can result in a low cost, compact and simple mechanism, past designs based on this approach have been deficient in that the brake spring in itself makes only frictional engagement with the brake drum and thus does not assure positive locking of the mechanism against forces acting against the backrest and sufficiently large to overcome the frictional force of the spring. Furthermore, the locking action of the brake spring tends to be more effective for holding the brake drum against rotation in one direction than in the opposite direction. Thus, prior recliner locking devices of this type are constructed so that the brake spring effectively holds the backrest against backward force such as applied by the weight of the seat occupant, but is less effective in holding the backrest against forwardly directed force which is added to the normal spring loading of the backrest, such as applied by a rear seat occupant accidentally or deliberately pushing forward on the backrest, or by road shock and vibration which tends to drive the backrest forward in small increments causing a gradual forward movement of the backrest known as "creep".

A continuing need therefore exists for an infinitely positionable reclining seat lock mechanism which takes advantage of the simplicity of the brake spring and drum locking action yet overcomes the aforementioned shortcomings of existing devices.

SUMMARY OF THE INVENTION

The infinitely positionable recliner lock of this invention improves over the prior art known to this applicant in that a coil spring is used to make an effective friction lock against both forward or backward forces applied to the seat backrest, and also includes simple and economical means for positively restraining the backrest in the event of slippage between the brake spring and brake drum of the locking mechanism.

The infinitely positionable backrest lock of this invention comprises a lower frame assembly attachable to the stationary portion of the recliner seat and an upper plate pivoted to the frame assembly and attachable to the movable backrest of the same seat. A toothed rack is formed along an arcuate edge of the upper plate which is drivingly connected through a reduction gear arrangement to a toothed drum wheel rotatably mounted to the lower frame. A brake spring is wound about a cylindrical drum surface on the drum wheel and fixed at one end to the frame assembly. The brake spring has a normal coil diameter smaller than the drum surface diameter such that the drum wheel is normally locked by tight frictional engagement with the spring coils against rotation relative to the frame assembly, thereby also locking the upper plate against pivotal movement. In one improvement according to this invention, the movable end of the brake spring is held by a movable clamping lever which is itself spring loaded and applies a winding torque to the spring end so as to more tightly wind the brake spring about the drum surface to thereby increase the grip of the brake spring on the brake drum beyond the gripping force which would be exerted by the unaided brake spring. The result is an increased frictional lock on the brake drum wheel and more effective locking action against both forward or backward pivoting of the upper plate so as to eliminate the aforementioned creeping and similar movements of the reclinable backrest.

A release lever is movable mounted to the lower frame assembly and in its normal locking position is spring loaded into engagement with the toothed periphery of the brake drum wheel. The release lever has an integral bolt element which is dimensioned to interlock with the teeth on the drum wheel so as to positively stop the drum wheel against rotation in the event slippage between the drum surface and brake spring, thus providing back-up or secondary locking means which in itself does not offer continuous positioning capability of the recliner backrest as is the case with the primary brake spring lock, but may be depended upon to arrest the backrest against movement in the event that the gripping action of the brake spring is overcome.

The spring loading of the release lever may be manually overcome for moving the release lever from its normal locking position to a release position thereby withdrawing the bolt element on the release lever from engagement with the drum wheel teeth and simultaneously bringing a cam portion of the release lever into engagement with the clamping lever so as to move the clamping lever against its spring loading. The clamping lever is cammingly moved to a release position while carrying the movable end of the brake spring so as to partially unwind the brake spring and thereby release the brake drum wheel for rotation relative to the frame assembly. The release lever upon being moved to a release position thus operates to disengage both the back-up safety lock and the primary spring lock, thereby releasing the drum wheel and the gear train interconnecting the same to the upper plate to permit repositioning of the seat backrest. The release lever thus serves the dual function of back-up or secondary safety lock in the event of slippage of the primary spring lock, and of manual lock release lever for disengaging the primary spring lock, thereby minimizing the cost and complexity of the locking mechanism while improving its reliability.

These and other advantages of the present invention will be better understood by reference to the following detailed description of the preferred embodiment taken in light of the accompanying drawings.

DETAILED DESCRIPTION OF THE PREFERRED EMBODIMENT

Figure 1:
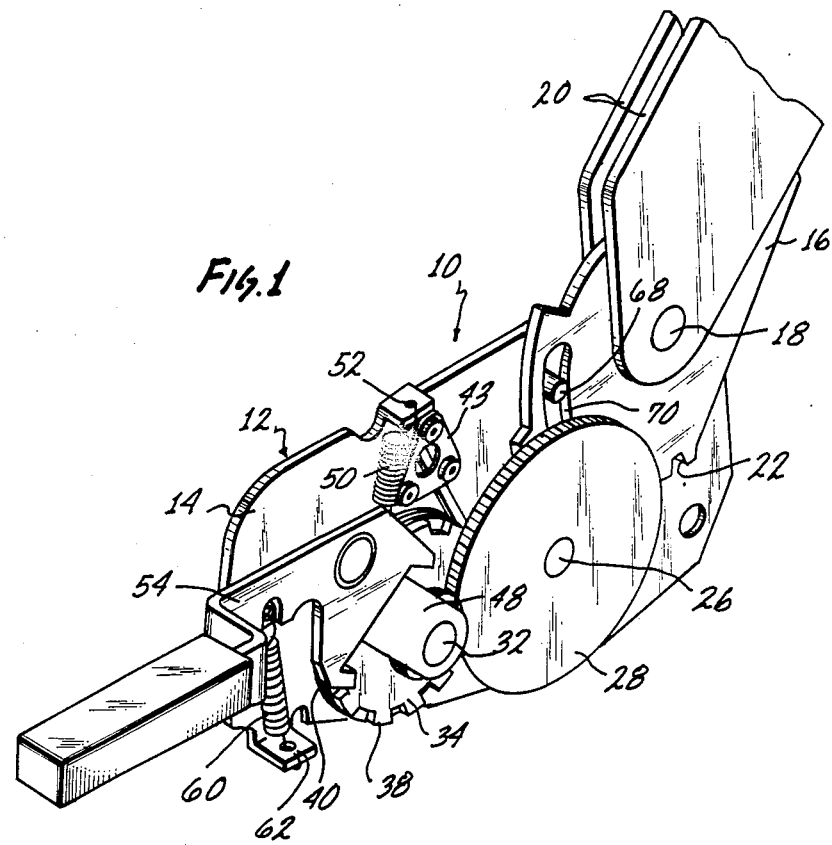
FIG. 1 is a perspective view of a continuously positionable recliner locking mechanism according to the present invention.
Figure 4:
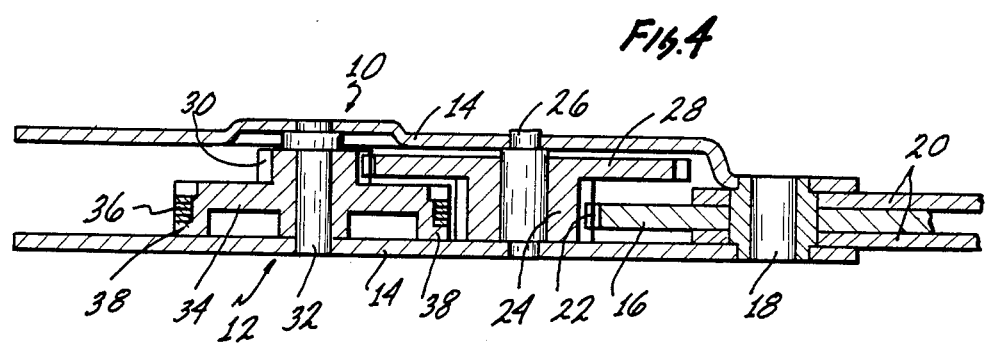
FIG. 4 is a cross-section taken along line 4—4 in FIG. 2.

With reference to the drawings, FIG. 1 shows the infinitely positionable lock 10 of this invention which comprises a lower frame assembly 12 consisting of two parallel generally planar plates 14, only one of which is shown in FIG. 1 for clarity of illustration, held together in fixed spaced apart relationship by various elements including pivot axles supporting the various parts of the mechanism, as will be described. The lock mechanism 10 further comprises an upper plate 16 pivotably mounted at 18 between the two frame plates 14, as best seen in FIG. 4. A pair of extender plates 20 are affixed to the upper plate 16 and serve to connect the upper plate 16 to the movable backrest of a recliner seat. The lower frame assembly 12 is fixed by suitable means to the stationary seat portion of the reclining seat as suggested in FIG. 2.

Figure 5:
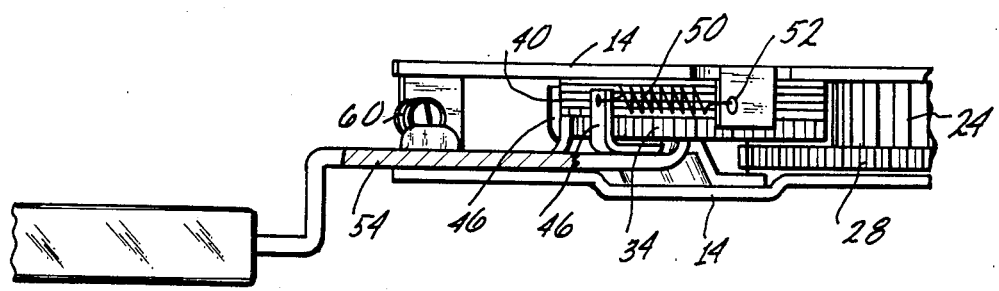
FIG. 5 is fragmentary top plan view of the lock of FIG. 1 showing the brake spring on the brake drum wheel and directly associated portions of the mechanism.
Figure 2:
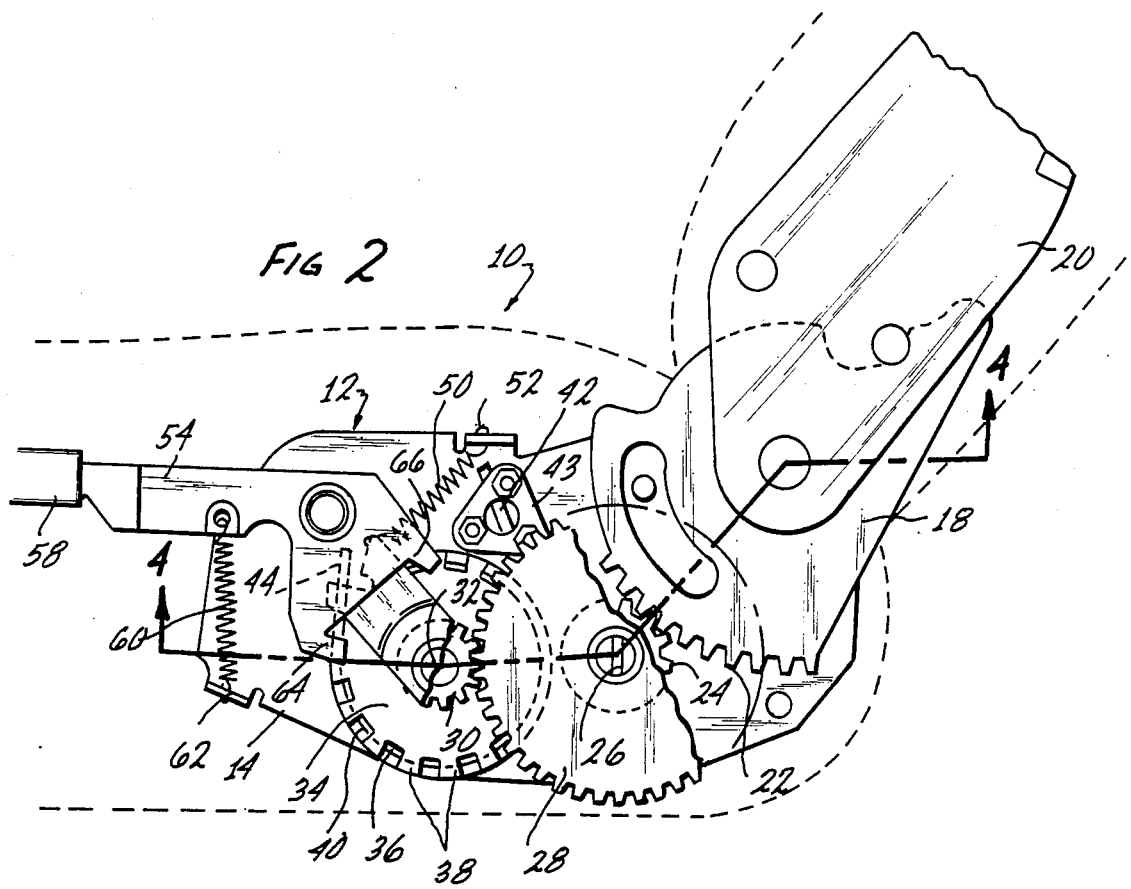
FIG. 2 is a side elevational view of the mechanism of FIG. 1 partly broken away to show the meshing portions of the reduction gear train, the mechanism being shown in a normal locked condition.

The upper plate 16 has an arcuate toothed lower edge defining a rack 22 which is in meshing engagement with a small gear 24 supported for rotation between the frame plates 14 by means of a first gear axle 26. A larger diameter gear 28 is fixed to the small gear 24 coaxially therewith on the gear axle 26 as shown in FIGS. 2 and 4. The larger gear 28 in turn is in mesh with a smaller gear 30 mounted for rotation relative to the frame 12 by means of a second gear axle 32 extending between the two plates 14. The gear 30 is coaxially fixed to or integral with a brake drum wheel 34 also rotatably mounted on the axle 32. The wheel 34 defines a cylindrical drum surface 36 about its periphery and also axially adjacent to the drum surface has radial teeth 38 spaced about the entire wheel circumference. A multi-turn helical coil brake spring 40 is wound around the drum surface 36 as seen in FIG. 5, and is anchored at a fixed spring end 42 to one plate 14 of the lower frame assembly under an anchor plate 43 screwed to the plate 14. The brake spring 40 has a natural coil diameter undersized in relation to the diameter of the brake drum surface 36 so that the spring 40 is wound tightly about and frictionally grips the brake drum wheel 34 in a normal condition. The wheel 34 is therefore locked against rotation relative to the frame assembly 12 because the end 42 of the spring is fixed to the frame. The opposite movable end 44 of the brake spring 40 is captive between two fingers 46 of a clamping lever 48. The inner end of the clamping lever is pivotable about the axle 32 independently from rotation of the toothed brake drum wheel 34 and gear 30. The radially outer end of the clamping lever 48 is provided with two finger elements 46 separated by a slot within which the movable end 44 of the brake spring 40 is held captive. A loading spring 50 is stretched between the outer end of the clamping lever 48 and anchor point 52 on plate 14 so as to urge the clamping lever 48 into clockwise pivotal movement, this also being the direction of winding of the brake spring 40. The effect of the spring 50 and clamping lever 48 is to wind the brake spring 40 more tightly around the brake drum surface 36 and therefore increase its frictional engagement and locking force upon the brake drum wheel 34 in a normal condition of the locking device 10. The wheel 34 is therefore normally secured against rotation relative to the frame assembly 12, thereby also preventing rotation of the reduction gear stage 26, 28 and preventing pivotal movement of the upper plate 18 which is in meshing engagement with the gear 24. The radius of curvature of the upper plate rack 24 is substantially greater than that of the gear 24, and likewise the diameter of gear 28 is substantially greater than the diameter of gear 30, thus forming two reduction gear stages between the plate 18 and the brake drum wheel 34. The diameter of the brake drum surface 36 is substantially greater than the diameter of the gear 30, the overall effect being that a relatively modest gripping force applied by the brake spring 40 to the brake drum wheel 34 is able to lock the upper plate 18 against loading by considerably greater forces acting on a backrest attached to the plate 18.

Figure 3:
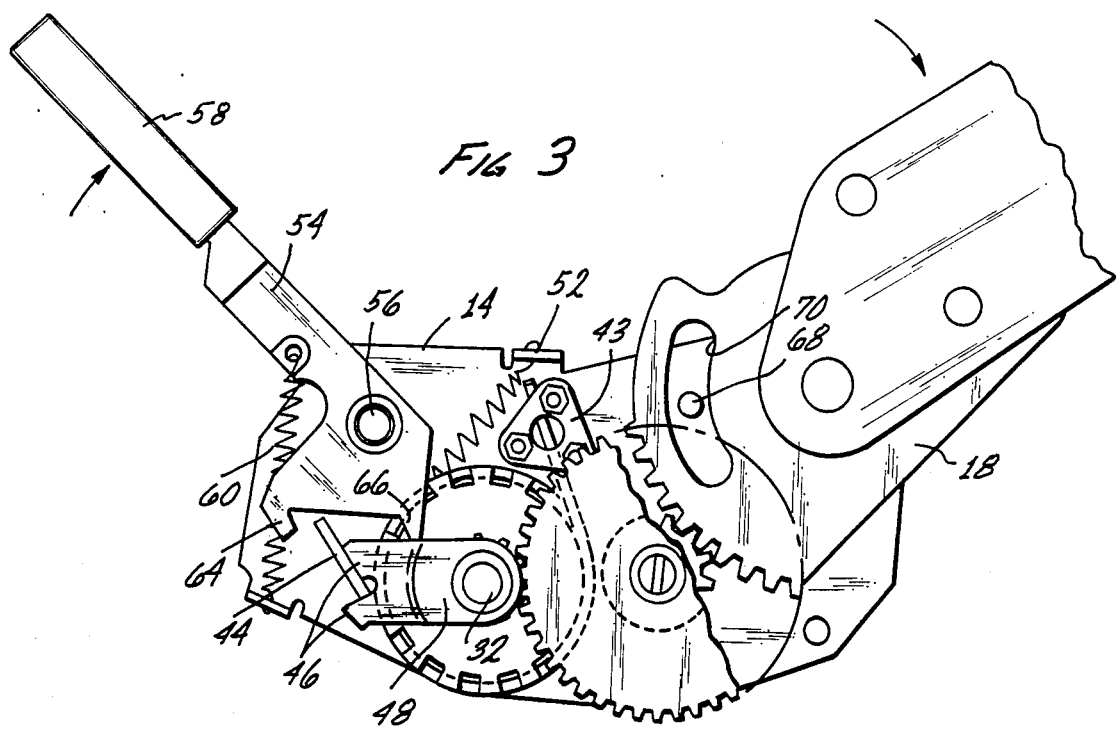
FIG. 3 shows the mechanism of FIG. 2 in an unlocked condition allowing free pivotal movement of the upper plate.

A lock release lever 54 is pivotably supported between the plates 14 by means of a pivot axle 56. The release lever has portions which are diametrically opposite the pivot axle 56. On an outer side is an elongated release handle 58 while on the inner portion of the release lever is attached one end of a spring 60 which is normally stretched between the release lever 54 and an anchor point 62 on one of the frame plates 14, so as to apply counter-clockwise torque to the release lever in FIGS. 2 and 3. A bolt element 64 is formed on the inner portion of the release lever 54 and is arranged and dimensioned so as to be driven towards interlocking engagement with the teeth 38 on the brake drum wheel 34 as a result of the torque applied by spring 60 to the release lever 54. The spacing between the teeth 38 is uniform and such as to admit the stop element 64 between any two adjacent teeth 38 on the wheel 34. The inner portion of release lever 54 also carries a cam element 66 which is normally spaced from the clamping lever 48, as seen in FIG. 2, but bears downwardly against the upper edge of the clamping lever 48 as in FIG. 3 when the release lever is pivoted from its normal locked condition shown in FIG. 2 to a release position shown in FIG. 3. The resulting clockwise arc of movement described by cam element 66 against the clamping lever forces the clamping lever 48 to pivot counter-clockwise against the force exerted by loading spring 50, stretching the spring 50 in the process. The counter-clockwise movement of the clamping lever 48 moves the end 44 of the brake spring 40 also in a counter-clockwise direction thus partially unwinding the spring 40 and releasing its frictional engagement with the drum surface 36. Continued clockwise movement of the inner portion of release lever 54 then withdraws the bolt element 64 from engagement with the teeth 38 on the brake drum wheel 34, thus freeing the wheel 34 for rotation on axle 32 relative to the lower frame assembly 12. The entire gear train 30,28,26,22 is now free to transmit rotation induced by pivotal movement of the upper plate 18 relative to the frame assembly 12, thus allowing adjustment of the reclinable backrest to a desired position relative to the stationary seat portion. The upper plate 18 may then be again fixed against pivotal movement relative to the frame assembly 12 by release of the lever 54 to its locked position of FIG. 2 under the urging of stretched coil spring 60. The cam element 66 moves upwardly allowing the clamping lever 48 to move clockwise under the urging of loading spring 50, returning the brake spring 40 its normal gripping state in relation to the brake drum wheel 34 and applying clamping torque to wind the spring 40 more tightly than it would be under its intrinsic resiliency, thus obtaining enhanced frictional engagement between the spring 40 and wheel 34. Release of the lever 54 to its locked condition also returns the stop element 64 into spring driven engagement with the teeth 38 of the wheel 34. Depending on the random positioning of the upper plate 18 in relation to the frame assembly 12 at the time that the release lever 54 is returned to its locked condition, the stop element 64 on the release lever may rest against the outer end of a particular tooth 38 on the wheel 34, rather than slipping into a space between two adjacent teeth 38.

The locking action is sequential in that the brake spring 40 is first released to its locking condition and the bolt element 64 is then moved against the toothed wheel 34. The lock 10 remains in this condition, with the stop element 64 resting against the outer edge of a particular tooth 38, so long as the brake drum wheel 34 is held against rotation by the brake spring 40. If an excessive load sufficient to overcome the frictional locking engagement of the spring 40 with the brake drum surface 36 is applied to the movable backrest of the seat and transmitted by the upper plate 18 through the reduction gear stages to the wheel 34, forcing rotation of the wheel 34, as soon as a tooth gap between two teeth 38 moves into alignment with the stop element 64, the stop element is driven by the loading of spring 60 on the release lever 54 into the tooth gap, positively locking the wheel 34 against further rotation. The spring loading of the cam lever 54 towards it normal locked state and consequent urging of the stop element into engagement with the teeth 38 serves as a backup or safety lock for the mechanism 10, with primary reliance being placed on the frictional engagement of the brake spring 40 with the brake drum surface 36. The primary lock allows continuous positioning of the upper plate 18 in relation to the lower bracket 12 between a fully erect and a fully reclined position limits of the pivotable plate 18. The secondary safety lock provided by the stop element 64 does not offer continuous positioning of the plate 18 but ensures positive locking of the recliner backrest following minimal slippage of the locking mechanism in the event that excessive loads are applied to the same. In some cases, depending on the selected backrest inclination, the position of the pivot plate 18 will be such as to bring the stop element 64 into immediate alignment with a gap between adjacent teeth 38, such that both the primary and secondary locking mechanism are simultaneously engaged to positively lock the seat backrest. In other cases, the earlier described situation will obtain where the stop element 64 merely rests on the outside edge of a tooth 38 and limited slippage of the wheel 34 takes place before positive locking by the stop bolt 64 is achieved. The slippage of the wheel can be made as small as desired by increasing the number of teeth 38, although practical considerations will limit the number of teeth provided.

The limits of pivotal motion of upper plate 18 are determined by a stop pin 68 fixed to one or both frame plates 14 and extending through an arcuate slot 70 in the upper plate 18. The length of arc of the slot 70 sets the limits on pivotal movement of the plate 18.

While a particular embodiment of the invention has been described and illustrated for purposes of clarity and explanation, various changes, modifications, and substitutions thereto will become apparent to those possessed of ordinary skill in the art without departing from the spirit and scope of the invention which is defined only by the following claims.

What is claimed is:

1. An infinitely positionable backrest lock for a recliner seat comprising:
lower frame means attacheable to a stationary portion of the recliner seat;
an upper plate pivoted to said lower frame and attacheable to the movable backrest of the recliner seat;
a toothed drum wheel rotatably mounted to said lower frame means;
gear means drivingly connecting said upper plate to said drum wheel such that pivotal movement of said upper plate is translated into rotary motion of said drum wheel;
brake spring means wound about said drum wheel and having a normal coil diameter less than the diameter of said drum wheel, said brake spring being secured to said lower frame means so as to normally lock said drum wheel against rotation;
clamping means normally operative for further tightening said brake spring about said drum wheel;
back-up locking means normally spring driven towards interlocking engagement with the teeth on said drum wheel for arresting said drum wheel against rotation in the event of slippage of said brake spring; and
release means actuatable for releasing both said brake spring and said back-up locking means from engagement with said drum wheel thereby to free said drum wheel for rotation and said upper plate for pivotal movement.

2. The device of claim 1 wherein said release means comprises a release lever pivoted to said lower frame for movement between a normal locking position and a lock release position and said back-up locking means comprises a bolt element integral with said release lever, said release lever being normally spring loaded towards a locking position wherein said bolt element is urged towards interlocking engagement with said toothed drum wheel so as to positively stop said drum wheel against rotation in the event of slippage of said brake spring, said bolt element being withdrawn from said interlocking engagement upon movement of said release lever towards said lock release position.

3. The device of claim 2 wherein said brake spring means is a coil spring having one end anchored to said lower frame and a movable spring end, said clamping means comprising a clamping lever pivoted to said lower frame and carrying said movable spring end and loading spring means normally urging said clamping lever for applying a winding torque to said brake spring thereby to increase the locking force of said brake spring, said release lever acting upon said clamping lever for unwinding said brake spring from said drum surface upon movement of said release lever towards said lock release position.

4. The device of claim 3 further comprising cam means integral with said release lever and engageable with said clamping lever upon movement towards said lock release position for pivoting said clamping lever against the urging of said loading spring thereby to unwind said brake spring.

5. An infinitely positionable backrest lock for a recliner seat comprising:
lower frame means attacheable to a stationary portion of the recliner seat;
an upper plate pivoted to said lower frame and attacheable to the movable backrest of the recliner seat;
a toothed rack along an arcuate edge of said upper plate;
a toothed drum wheel rotatably mounted to said lower frame;
reduction gear means drivingly interconnecting said rack to said drum wheel;
spring means wound about said drum wheel and fixed to said lower frame, said spring means having a normal diameter smaller than said drum wheel such that the drum wheel is normally locked by said spring means against rotation relative to said lower frame thereby to lock said upper plate against pivotal movement;
clamping means normally operative for tightening said spring means about said drum wheel to thereby augment its locking action;
back-up locking means spring loaded towards interlocking engagement with the teeth on said drum wheel so as to positively secure said drum wheel against rotation in the event of slippage of the drum wheel relative to said spring means; and
release means operative for partly unwinding said spring and for disabling said back-up locking means so as to free said drum wheel for rotation thereby permitting pivotal movement of said upper plate and adjustment of the backrest position.

6. An infinitely positionable backrest lock for a recliner seat comprising:
lower frame means attacheable to a stationary portion of the recliner seat;
an upper plate pivoted to said lower frame and attacheable to the movable backrest of the recliner seat;
a toothed rack along an arcuate edge of said upper plate;
a transfer gear wheel rotatably mounted to said lower frame;
a first reduction gear in mesh with said rack and mounted for turning said transfer gear responsive to pivotal movement of said plate;
a toothed drum wheel rotatably mounted to said lower frame;
a second reduction gear fixed coaxially to said brake drum and in mesh with said transfer gear wheel;
brake spring means wound about said drum wheel and fixed to said lower frame for normally locking said drum wheel against rotation relative to said lower frame;
clamping lever means movable mounted to said lower frame;
second spring means normally acting on said clamping lever for more tightly winding said brake spring means about said drum wheel to thereby augment its locking action;
release lever means movable mounted to said lower frame and actuatable into engagement with said clamping lever means for partially unwinding said brake spring means to thereby release said drum wheel for rotation; and
third spring means normally urging said release lever into interlocking engagement with the teeth on said toothed drum wheel to thereby positively lock said drum wheel against rotation in the event of slippage thereof relative to said brake spring.

7. An infinitely positionable backrest lock for a recliner seat comprising:
lower frame means attacheable to a stationary portion of the recliner seat;

an upper plate pivoted to said lower frame and attacheable to the movable backrest of the recliner seat;

gear means including a drum wheel rotatably mounted to said lower frame means drivingly connected with said upper plate such that pivotal movement of said upper plate is translated into rotary motion of said drum wheel;

brake spring means fixed to said lower frame and normally frictionally engaging said drum wheel so as to normally lock said drum wheel and gear means against rotation thus also locking said upper plate;

clamping means normally operative for further increasing said frictional engagement of said brake spring with said drum wheel thereby to increase the locking engagement of said spring against rotation of the drum wheel in either direction; and release means actuatable releasing said brake spring from engagement with said drum wheel thereby to free said drum wheel for rotation and said upper plate for pivotal movement.

* * * * *